United States Patent
Larson

Patent Number: 5,957,090
Date of Patent: Sep. 28, 1999

[54] ELECTROSTATIC PET HAIR REMOVER

[76] Inventor: Keith H. Larson, 11487 Scripps Creek Dr., San Diego, Calif. 92131

[21] Appl. No.: 09/060,092

[22] Filed: Apr. 14, 1998

[51] Int. Cl.[6] .................................................. A01K 13/00
[52] U.S. Cl. ............................. 119/600; 15/1.52; 607/79
[58] Field of Search ..................... 119/613, 622, 119/652, 615, 600, 612; 15/393, 1.51, 1.52; 361/311; 601/21; 607/79, 145

[56] References Cited

U.S. PATENT DOCUMENTS

| | | | |
|---|---|---|---|
| 1,568,226 | 1/1926 | Larson | 119/622 |
| 2,373,140 | 4/1945 | Oppermann | 361/287 |
| 2,865,329 | 12/1958 | Elliott | 119/622 |
| 2,891,204 | 6/1959 | Kuhn | 361/311 |
| 2,976,841 | 3/1961 | Scheffer | 119/622 |
| 3,892,247 | 7/1975 | Andersen | 132/11 R |
| 4,083,073 | 4/1978 | Bernardini | 15/1.52 |
| 4,255,776 | 3/1981 | Cantelli | 361/213 |
| 4,301,766 | 11/1981 | Piccone | 119/482 |
| 4,674,152 | 6/1987 | Georges | 452/73 |
| 4,938,169 | 7/1990 | Barmakian | 119/622 |
| 5,258,886 | 11/1993 | Murayama et al. | 361/321.5 |
| 5,458,088 | 10/1995 | Owens | 119/622 |
| 5,502,873 | 4/1996 | Hogan | 15/393 |
| 5,546,895 | 8/1996 | Brown | 119/484 |

*Primary Examiner*—Robert P. Swiatek
*Assistant Examiner*—Son T. Nguyen

[57] ABSTRACT

A device for removing dirt, loose hair, dander, etc. from objects such as household pets comprising an electrostatic generator 12 connected to an electrostatic element 10. The electrostatic element is a high voltage capacitor with extended core dielectric 10C. If an object such as a pet is brought in close proximity to its surface the electrostatic force pulls dirt and loose hairs off and retains them. A discharge means 12A provides for the release of the collected dirt and loose hairs. When incorporated into a grooming device such as a brush 18 it provides a more efficient method for removing loose hairs.

1 Claim, 3 Drawing Sheets

ELECTROSTATIC PET HAIR REMOVER

BACKGROUND—FIELD OF INVENTION

This invention relates to pet grooming methods, particularly those which remove loose hair, dander, etc. by automatic or semi-automatic means.

BACKGROUND—DESCRIPTION OF PRIOR ART

Many household pets such as cats and dogs share a common drawback: they shed hair and dander. These items are unsightly on household furnishings, and cause allergic reactions in many persons. Also pets swallow loose hair when they lick themselves, which can cause them to choke or become ill.

Some attempts have been made to deal with this problem. U.S. Pat. Nos. 4,301,766 to Piccone (1981), 5,546,895 to Brown (1991), 5,458,088 to Owens (1995), and 4,938,169 to Barmakian (1990), are some examples of inventions which provide a means of "automatically" removing loose hair. They purport to do so by brushing the animal as it passes through a device. However, all of these suffer several common deficiencies:

a) They all require cooperation of the pet to pass through the device and accept the feel of bristles or comb teeth against their fur.

b) With the exception of Piccone, they all require the cutting of holes in doors or walls. This is expensive, degrades the appearance of the dwelling, and creates an opening for weather and rodents to enter the residence.

c) The Piccone device requires a large amount of floor space.

d) They all require frequent cleaning.

e) Their bristles have the potential of causing injury to the animal or even to small children. One must wonder what the consequences are for the pet if it decides to back up when halfway through the device.

Other inventions, such as U.S. Pat. No. 5,502,873 (1996 Hogan), either utilize a brush, or a brush in combination with a vacuum device, for removing loose pet hair. They too require the cooperation of the pet. Plus they require the active involvement of a person to brush the pet. A further limitation is that while many pets enjoy being brushed, many others do not. And the vacuum would almost surely frighten most pets with its hissing sound.

Only one other invention utilizes electrostatics to assist in the removal of hair from animals, that of U.S. Pat. No. 4,674,152 to Auberti (1987). However, it is not a grooming device, and proper operation requires that the animal be slaughtered first.

OBJECTS AND ADVANTAGES

Accordingly, several objects and advantages of the present invention are:

a) Requires no physical contact with the pet.

b) Requires no alterations to the household walls or doors, nor does it require additional floor space.

c) Provides a self-cleaning mechanism for easily removing collected hair.

Further advantages of the present invention are:

1) Provides a pet hair remover which has all the above objects and advantages that is also transportable. This utilizes either a battery or a gas barbeque-type igniter for the high voltage (electrostatic) generator. 2) Provides a more efficient pet hair brush.

Still further objects and advantages will become apparent from a consideration of the ensuing description and drawings.

SUMMARY OF THE INVENTION

In accordance with the present invention, an electrostatic element is defined which is in essence a high voltage capacitor constructed and employed in various ways so as to utilize electrostatic force to remove dirt and loose hair, etc. from objects such as household pets.

BRIEF DESCRIPTION OF THE DRAWINGS

The present invention will be more apparent from the accompanying figures, which are provided by way of non-limiting example and in which.

Drawings

Drawings

Figure 1:
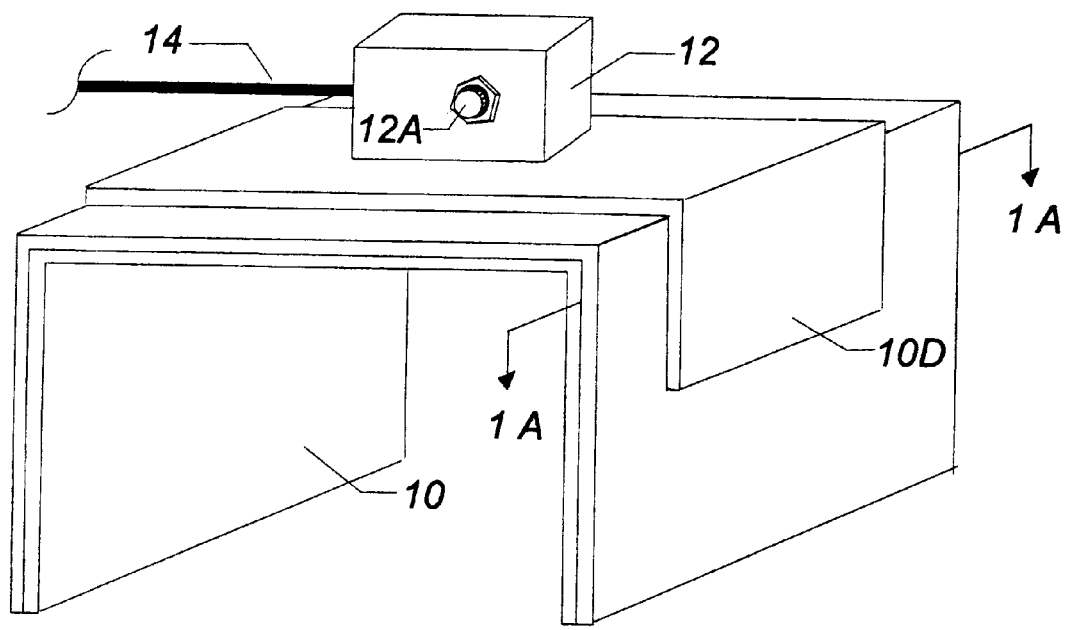
FIGS. 1 and 1A show perspective view and cross section view of a typical generalized embodiment of the invention.

| Reference Numerals in Drawings | | | | | |
|---|---|---|---|---|---|
| 10 | Electrostatic Element | 12 | Electrostatic Generator | 20 | Cat |
| 10A | Dielectric cover | 12A | Discharger | 22 | Litter box housing |
| 10B | High voltage metal plate | 12B | Activator | 24 | Portal |
| | | 14 | Powering Member | 26 | Loose hair |
| 10C | Core dielectric | 16 | High Voltage cable | 28 | Flap |
| 10D | Neutral metal plate | 18 | Plastic Pet Hair Brush | | |

DETAILED DESCRIPTION OF THE DRAWINGS—FIGS. 1 TO 3

FIG. 1 shows a perspective view of a generalized electrostatic element 10 which can be placed over or inside an existing animal shelter or housing; or incorporated as part of a pet portal or entryway. Also shown is an electrostatic generator 12 and a powering member 14.

Figure 1A:
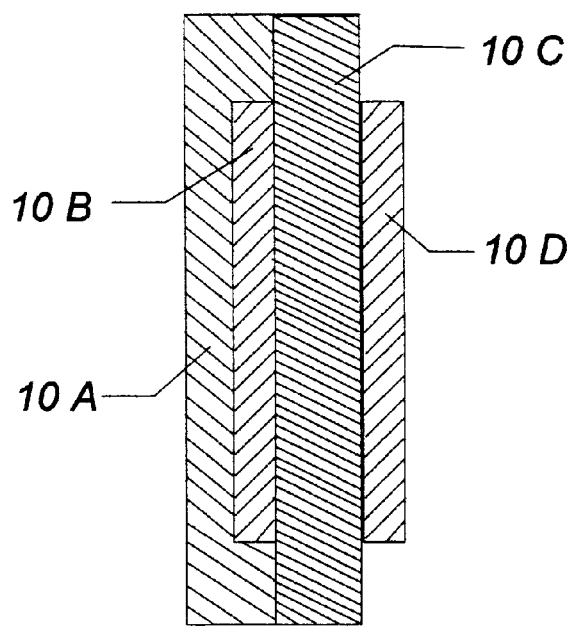

FIG. 1A shows a cross sectional view of the Electrostatic Element, which is essentially a high voltage capacitor. It is comprised minimally of a thin sheet of core dielectric 10C sandwiched between two metal plates 10B, 10D. Core dielectric 10C is material with dielectric properties sufficient to prevent a spark from jumping between plates 10B, 10D at the highest anticipated charge voltage. Core dielectric 10C is typically commercial grade vinyl plastic. Metal plates 10B, 10D may be of almost any metal, but household aluminum foil works well and is inexpensive. Wires from electrostatic generator 12 are attached to metal plates 10B, 10D by soldering or other means. Finally, a dielectric cover 10A is attached with heat, glue or other suitable technique.

As will be shown in following descriptions, the dimensions of the electrostatic element and its component parts may vary widely depending on the application and other factors such as cost, safety and aesthetics.

Electrostatic generator 12 is of conventional type for the expert of the art and will not be described in detail. Included is a discharger 12A.

Powering member 14 can be a usual battery or an ac power adapter for connecting the electrostatic generator to a prime power source.

Figure 2:
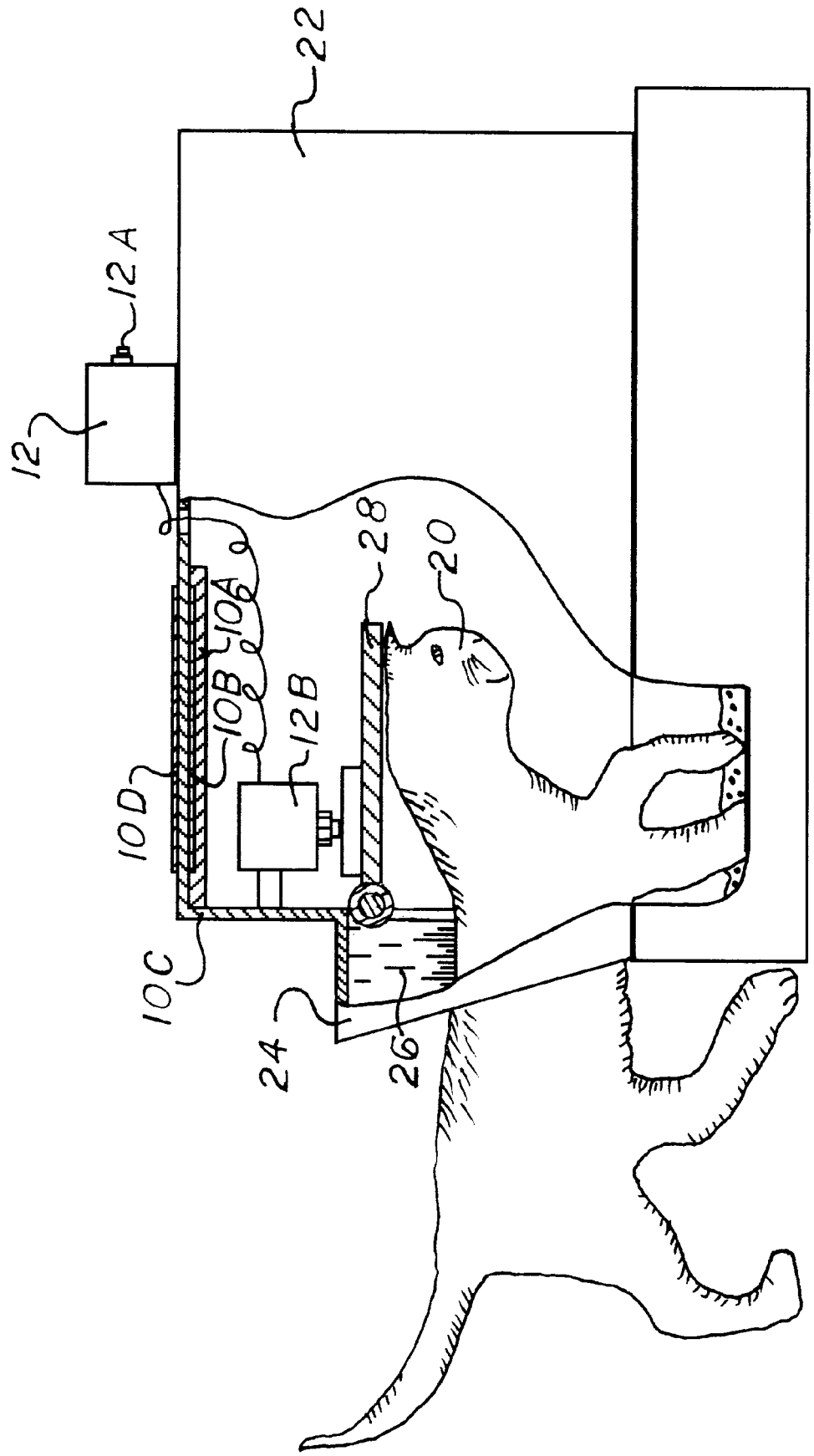
FIGS. 2 and 3 show more specific embodiments of the invention.

Alternatively, a piezoelectric or other transducer may be substituted for the combination of electrostatic generator and powering member. FIG. 2 shows an activator 12B for activating such a transducer.

FIG. 2 is a more specific embodiment of the present invention, whereas the electrostatic element is incorporated into the structure of a plastic cat litter box housing. The housing may be employed as either core dielectric 10C or dielectric cover 10A. It is shown as core dielectric 10C in FIG. 2. Also shown in FIG. 2 is a cat 20 entering a litter box 22 through a portal 24. To enter, it pushes against a flap 28 which in turn presses against an activator 12B which is connected to electrostatic generator 12 by wires.

Figure 3:
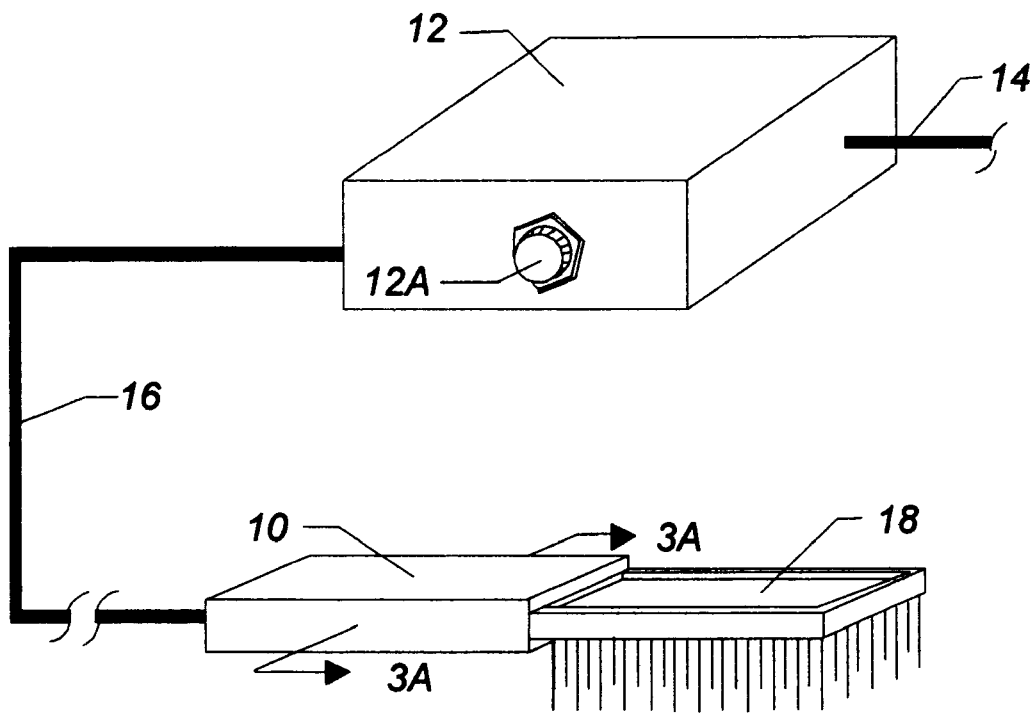
Figure 3A:
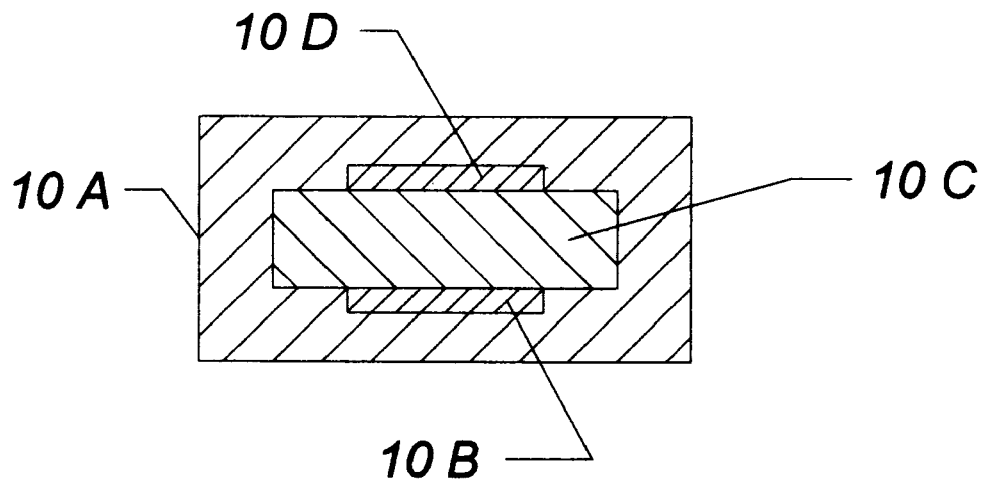

FIGS. 3 and 3A show another typical embodiment of the invention. A plastic hairbrush handle 18 is utilized as the core dielectric, with metal plates 10B, 10D integrated as shown. The unit is connected to electrostatic generator 12 by a high voltage cable 16. A dielectric cover 10A is attached to surround the entire handle. Alternatively, a miniaturized electrostatic generator can be built into the handle and the entire assembly encapsulated.

Operation

In FIG. 1 electrostatic generator 12 provides the direct current and high voltage necessary for operation of electrostatic element 10. Many methods of generating an electrostatic charge have been devised since Otto Von Guericke built the first electrostatic generator in 1660. Therefore its operation will not be described here in detail.

The electrostatic element is a device for storing an electrostatic charge. It is basically comprised of a thin sheet of dielectric material 10C, only part of which is sandwiched between two metal plates 10B, 10D. Only neutral plate 10D can be seen in FIG. 1, while FIG. 1A illustrates both. When charged to several thousand volts an electrostatic force is produced which attracts loose pet hair in its immediate vicinity. This force has the following characteristics:

1) Its intensity is directly proportional to the potential difference between the electrostatic element and the pet.

2) Its intensity is inversely proportional to the square of the distance from electrostatic element to the pet. Therefore it is strongest in the space directly adjacent to the electrostatic element.

3) It is applied in a direction which is normal (perpendicular) to the electrostatic element surface. Therefore having the pet come as close to the surface as possible increases the effectiveness of the device in removing loose hair.

For safety reasons it is recommended that the electrostatic element's total charge be kept below 0.04 Joule. Since 10 Joules is the amount believed to be a danger to human life, 0.04 Joules represents a safety factor of 250. An expert of the art can compute the maximum voltage and capacitance allowed for a given application. Also the plate edges should be rounded to prevent corona discharge. Corona discharge reduces the device's effectiveness and can lead to sparking.

A discharger 12A for discharging the electrostatic element is provided. During normal operation, the collected hairs clinging to the electrostatic element surface acquire some electrostatic charge. When discharger 12A is activated, the discharging process causes the electrostatic element potential to pass through the same potential as the hair. Since similar charges repel each other, the clinging hairs are repelled and fall to the shelter floor. In the case of a cat litter box the collected hairs fall into the litter for convenient disposal.

For portability the electrostatic generator is battery operated, or replaced altogether by an electro-mechanical transducer. In either case an activation device is provided. This is necessary to either save battery power, or provide the mechanical force necessary for the transducer to generate a voltage. An example is shown in FIG. 2 where the cat pushes against a door or flap 28, which in turn presses against activator 12B.

FIG. 1 perspective view of electrostatic element 10 shows center dielectric 10C extending beyond the plates. This indicates an important property of the electrostatic element: the electrostatic force continues to be exhibited by the dielectric material beyond the confines of the area between the plates. This property is used to advantage in the embodiments.

One example of this property is illustrated in FIG. 2. As a cat 20 enters a litter box 22 it passes through a portal 24 in close proximity to extended core dielectric 10C. Because of the close proximity the force is strong and pulls loose hairs 26 off the cat.

Another example of this property is in the pet brush embodiment of FIG. 3. While electrostatic element 10 is physically confined to the brush handle, its electrostatic force extends via the core dielectric to the brush area. Thus, as the pet is brushed, the electrostatic force in the bristles attracts loose hairs and holds them, far more efficiently than mere brushing alone. A further side benefit is that, as noted above, a discharge means compels the brush to repel the hairs it has collected. This makes it easier for the operator to remove the hairs from the brush for disposal.

A further benefit is that the electrostatic force is present on both sides of the core dielectric. Therefore a device such as shown in FIG. 1 can do double duty: 1) as a loose pet hair remover when the pet is inside, and 2) a dust and particle collector from the air outside. However, the outside force is not present in the space adjacent to neutral plate 10D. So if this property is not desired in a particular area, it can be eliminated by extending neutral plate 10D to cover that area.

Finally it should be noted that the illustrated embodiments are given by way of example only, and that numerous modifications are possible all falling within the same inventive concept.

Conclusion, Ramifications, and Scope

Accordingly, the reader will see that the electrostatic element of this invention can easily and conveniently remove loose pet hairs. It accomplishes this by harnessing the attractive force of electrostatics.

It allows unattended operation when incorporated into a pet portal or housing.

It adds efficiency and convenience when incorporated into grooming devices such as brushes.

It provides for a portable unit or one that can be operated without access to prime power, such as in an entryway or remote pet shelter.

It provides a method of removing dust and airborne dirt.

Its discharge feature provides a convenient method of removing collected loose hairs.

Although the description above contains many specificities, these should not be construed as limiting the scope of the invention but as merely providing illustrations of some of the presently preferred embodiments of this invention. For example, the electrostatic pet hair remover could also be used to remove loose hair, dandruff, etc. from humans. Its discharge feature could be applied to removing dirt from vehicles such as automobiles, which attaches itself by electrostatic force.

Thus the scope of the invention should be determined by the appended claims and their legal equivalents, rather than by the examples given.

I claim:

1. A device for utilizing the energy storage properties of a conventional high voltage capacitor and the attractive force of electrostatics to easily and conveniently remove dirt, loose hairs, and dander from household pets, comprising:

a. a high voltage capacitor comprising a dielectric material partially sandwiched between two metal plates, and constructed so as to be an integral part of a grooming device;

b. an electrostatic generator comprising electronic circuitry or electro-mechanical means for producing an electrostatic charge;

c. a connector means for joining said electrostatic generator to said high voltage capacitor for the purpose of transferring said electrostatic charge to said high voltage capacitor.

* * * * *